US006611622B1

(12) United States Patent
Krumm

(10) Patent No.: US 6,611,622 B1
(45) Date of Patent: Aug. 26, 2003

(54) OBJECT RECOGNITION SYSTEM AND PROCESS FOR IDENTIFYING PEOPLE AND OBJECTS IN AN IMAGE OF A SCENE

(75) Inventor: John Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/448,616

(22) Filed: Nov. 23, 1999

(51) Int. Cl.[7] ................................................ G06K 9/00
(52) U.S. Cl. ...................................... 382/170; 382/165
(58) Field of Search .................. 382/162–180

(56) References Cited

U.S. PATENT DOCUMENTS

| | | | | | |
|---|---|---|---|---|---|
| 5,594,807 | A | * | 1/1997 | Liu ............................. | 382/168 |
| 6,115,495 | A | * | 9/2000 | Tachikawa et al. ......... | 382/170 |
| 6,389,168 | B2 | * | 5/2002 | Altunvasak et al. ........ | 382/224 |
| 6,477,272 | B1 | * | 11/2002 | Krumm et al. ............. | 382/170 |

OTHER PUBLICATIONS

D. P. Huttenlocher, G. A. Klanderman, and W. J. Ricklidge, "Comparing Images Using the Hausdorff Distance," IEEE Transactions on Pattern Analysis and Machine Intelligence, vol. 15, pp. 850–863, 1993.
Y. Lamdan and H. J. Wolfson, "Geometric Hashing: A General and Efficient Model–Based Recognition Scheme," presented at Second International Conference on Computer Vision, Tampa, Florida, 1988.
S. Sclaroff and J. Isidoro, "Active Blobs," presented at Sixth International Conference on Computer Vision, Bombay, India, 1998.

M. Turk and A. Pentland, "Eigenfaces for Recognition," Journal of Cognitive Neuroscience, vol. 3, pp. 71–86, 1991.
H. Murase and S. K. Nayar, "Visual Learning and Recognition of 3–D Objects from Appearance," International Journal of Computer Vision, vol. 14, pp. 5–24, 1995.
M. J. Swain and D. H. Ballard, "Color Indexing," International Journal of Computer Vision, vol. 7, pp. 11–32, 1991.

* cited by examiner

*Primary Examiner*—Jingge Wu
(74) *Attorney, Agent, or Firm*—Lyon & Harr, LLP; Richard T. Lyon

(57) ABSTRACT

An object recognition system and process that identifies people and objects depicted in an image of a scene. In general, this system and process entails first creating model histograms of the people and objects that it is desired to identify in the image. Then, the image is segmented to extract regions which likely correspond to the people and objects being identified. A histogram is computed for each of the extracted regions, and the degree of similarity between each extracted region histogram and each of the model histograms is assessed. The extracted regions having a histogram that exhibits a degree of similarity to one of the model histograms which exceeds a prescribed threshold is designated as corresponding to the person or object associated with that model histogram. Finally, the histogram computed for any extracted region of the image that is designated as corresponding to a person or object associated with a model histogram can be stored as an additional model histogram associated with that person or object. Preferably, the foregoing general system and process is repeated for subsequently generated images of the scene, so that the identity of people and objects can be monitored over time as they move into and about the scene. In addition, preferably color images of the scene and color histograms are employed in the object recognition system and process.

31 Claims, 10 Drawing Sheets

OBJECT RECOGNITION SYSTEM AND PROCESS FOR IDENTIFYING PEOPLE AND OBJECTS IN AN IMAGE OF A SCENE

BACKGROUND

1. Technical Field

The invention is related to a computer-implemented object recognition system and process for identifying people and objects in an image of a scene, and more particularly, to such a system and process employing color images, color histograms, and techniques for compensating for variations in illumination in the scene, as well as a employing a sum of match qualities approach to best identify each of a group of people and objects in the image of the scene.

2. Background Art

Object recognition in images is typically based on a model of the object at some level of abstraction. This model is matched to an input image which has been abstracted to the same level as the model. At the lowest level of abstraction (no abstraction at all), an object can be modeled as a whole image and compared, pixel by pixel, against a raw input image. However, more often unimportant details are abstracted away, such as by using sub-templates (ignoring background and image position), normalized correlation (ignoring illumination brightness), or edge features (ignoring low spatial frequencies). The abstraction itself is embodied in both the representation of the object and in the way it is matched to the abstracted image. For instance, Huttenlocher et al. [1] represent objects as simple edge points and then match with the Hausdorff distance. While the edge points form a completely rigid representation, the matching allows the points to move nonrigidly.

One interesting dimension of the aforementioned abstraction is rigidity. Near one end of this dimension are the several object recognition algorithms that abstract objects into a rigid or semi-rigid geometric juxtaposition of image features. These include Hausdorff distance [1], geometric hashing [2], active blobs [3], and eigenimages [4, 5]. In contrast, some histogram-based approaches abstract away (nearly) all geometric relationships between pixels. In pure histogram matching, e.g. Swain & Ballard [6], there is no preservation of geometry, just an accounting of the number of pixels of given colors.

Abstracting away rigidity is attractive, because it allows the algorithm to work on non-rigid objects and because it reduces the number of model images necessary to account for appearance changes. For example, color histograms are invariant to translation and rotation about the viewing axis, and change only slowly under change of angle of viewing, change in scale, and occlusion. Because histograms change slowly with view, a three-dimensional object can be adequately represented by a small number of histograms.

However, the use of histograms for object recognition systems is not without drawbacks. One of these drawbacks involves identifying each of a group of people in an image of a scene. Typically, the aforementioned matching of models to an input image involves the use of a threshold where a model is deemed to match a portion of the input image when their similarity is above this threshold. The threshold is usually chosen so that it is reasonably certain that a portion of the input image actually corresponds to the person or object in the "matching" model. However, it is not chosen to be so high that anticipated variations in the abstractions of the same person or object between the model and the input image cannot be accounted for in the matching process. This thresholding scenario can present a problem though when it is desired that more than one person or object be identified in the input image. Essentially, it is possible that the abstractions of two different people or objects from the input image may both match the abstraction of a single model in that the aforementioned threshold is exceeded when each is compared to the model. Thus, there is a question as to the actual identity of each of these people or objects.

Another particularly troublesome drawback to the use of histograms in object recognition systems is caused by the fact that illumination conditions typically vary from place to place in a scene. Variations in illumination can significantly alter a histogram of an image as the apparent colors tend to change. Thus, a histogram created from an image of a person or object at a first location under one lighting condition may not match a histogram created from an image of the same person or object at another location in the scene which is under different lighting conditions. If the deviation is severe enough, it will not be possible to recognize that the two histograms are associated with the same person or object. Lighting conditions can also change in a scene over the course of a day. Thus, even if a person or object is in the same location for extended periods of time, the illumination conditions, and so the computed histograms, might change. Here again it may become impossible to recognize that the histograms belong to the same person or object if the change in illumination is significant. The system and process according to the present invention introduces some unique techniques to the use of histograms for object recognition that mitigate the above described issues.

It is noted that in the preceding paragraphs the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [4, 5]. A listing of the publications corresponding to each designator can be found at the end of the Detailed Description section.

SUMMARY

This invention is directed toward an object recognition system and process that identifies people and objects depicted in an image of a scene. In general, this system and process entails first creating, by some not necessarily automatic means, model histograms of the people and objects that it is desired to identify in the image. Then, the image is segmented to extract regions which likely correspond to the people and objects being identified. In our terminology, a "model histogram" is a stored histogram that is associated with a certain person or thing, and it tells what the person or thing is expected to look like. A "region histogram" is a histogram extracted from the actual "live" image of the scene. A region histogram is computed for each of the extracted regions, and a match quality indicator of the degree of similarity between each extracted region histogram and each of the model histograms is computed. The extracted regions having a histogram that exhibits a degree of similarity to one of the model histograms which exceeds a prescribed threshold is designated as corresponding to the person or object associated with that model histogram. In one embodiment of the present invention, this designation is accomplished as follows. The largest match quality indicator is identified for each extracted region, and the region is designated as being the person or object associated with the model histogram used in part to compute the largest match quality indicator whenever the indicator exceeds the aforementioned threshold. In the case where extracted regions have histograms that do not exhibit a degree of similarity to any of the model histograms which exceeds the prescribed threshold, the designation technique employed is preferably the same, except that the designation is one of an unknown person or object. In addition, the region histogram computed for any extracted region of the image that is designated as corresponding to a person or object associated with a model histogram is stored as an additional model histogram associated with that person or object.

In an alternate embodiment of the present invention, the designation that an extracted region corresponds to the person or object associated a model histogram is accomplished as follows. First, exclusive combinations of the match quality indicators are formed. Each of these combinations is made up of one indicator associated with each extracted region of the image, and each indicator in the combination is derived from a different model histogram. A combined degree of similarity value is computed for each of the indicator combinations. Preferably, this entails summing the indicators in each combination to produce the combined indicator. The largest of the combined indicators is then identified. The extracted regions having a histogram associated with one of the indicators used to compute the identified largest combined indicator that exceeds the prescribed threshold, are designated as corresponding to the person or object associated with the model histogram used in part to compute that respective indicator. A histogram computed for any extracted region of the image that is designated as corresponding to a person or object associated with a model histogram can also be stored as an additional model histogram, as in the previous embodiment. In addition, any of the remaining extracted regions having histograms associated with the indicators used to compute the largest combined indicator that do not exceed the prescribed threshold can be designated as corresponding to an unidentified person or object.

Preferably, in either embodiment, the system and process is repeated for subsequently generated images of the scene, so that the identity of people and objects can be monitored over time as they move into and about the scene. This makes the action of storing additional model histogram particularly advantageous as it improves the robustness of the object recognition technique. This is because people and objects can be "cataloged" in various parts of the scene and at different times. As discussed previously, illumination differences throughout a scene can affect histograms significantly. Therefore, having model histograms associated with a person or object in different parts of the scene improves the chances of an accurate identification.

The aforementioned image is preferably a color image of the scene, and the model histograms and region histograms are color histograms. When color images and histograms are used, it is preferred that they be created as follows. Model histograms are created by first capturing one or more model images of the people and objects it is desired to identify. Each model image is segmented to extract model regions which correspond to each of the aforementioned people and objects. Then, for each model region, the actual colors exhibited by the pixels of the model region are determined and the overall gamut of actual colors exhibited by the pixels is divided into a series of discrete color ranges, hereinafter referred to as quantized color categories. Each pixel of the extracted model region is respectively assigned to the quantized color category into which the actual color of the pixel falls. Finally, a model color histogram is produced by establishing a count of the number of pixels of each extracted model region assigned to the same quantized color category. The method for computing color histograms for extracted regions of the color image of the scene is identical, and it is preferred that the same quantized color categories be used for each histogram.

In addition, when color images and color histograms are employed in the present object recognition system and process, it is preferred that the degree of similarity between an extracted region histogram and a model histogram be assessed as follows. First, the respective pixel count from each quantized color category of the histogram derived from the extracted region is compared to the pixel count from the corresponding quantized color category of the model histogram. The purpose of this is to identify the smaller of the two counts. These smaller counts are then added together to produce a similarity value. This assessment is repeated for each pair of histogram compared. It is noted that two matching histograms will have a larger similarity value than non-matching histograms because the smallest count from each category will be nearly as large as the larger count, whereas the smaller counts in non-matching histograms are likely to be significantly smaller than the larger value. Thus, the sum of the smaller counts from matching histograms should be larger than the sum of the counts for non-matching histograms. Finally, the similarity value associated with each pair of compared histograms is normalized for each extracted region of the image of the scene. This is accomplished by dividing the similarity value by a maximum possible similarity value to produce the aforementioned match quality indicator.

The present invention also encompasses a refined system and process for identifying people and objects in an image of a scene. This refined process begins with the creation of initial model histograms of the people and objects that it is desired to identify in "live" images of the scene. This is preferably accomplished by first dividing one or more prefatory images of the scene into a plurality of cells. Each of the initial model histograms is created from a region extracted from a prefatory image which is known to depict a particular person or object of interest. These initial model histograms are then assigned to the image cell where the centroid of their associated extracted regions reside. The extraction and histogram creation procedures are accomplished in the same manner as discussed above in connection with the description of the basic object recognition process.

Once the initial model histograms are created and assigned to the appropriate cell, the processing of "live" images of the scene can begin. Here again the segmentation of the live image to extract regions likely to depict a person or object of interest and the creation of a histogram from each extracted region proceeds as discussed previously. Each live image is then divided into the aforementioned plurality of cells. The centroid of each extracted region is determined and the cell in which it resides is identified. Next, for each "set" of model histograms associated with the same person or object, it is determined which cell having one of the model histograms in the set assigned to it is the closest to the identified cell associated with the extracted region. Then, the same assessment techniques of either of the above-described embodiments of the basic process are employed to assess the degree of similarity between the histogram computed for an extracted region and each of the model histograms determined to correspond to a different one of the people or objects of interest and assigned to the cell closest to the identified cell (which of course could be the identified cell itself). If, it is determined that an extracted region's histogram exhibits a degree of similarity to one of the model histograms which exceeds the aforementioned threshold, then the region's histogram is designated as corresponding to the person or object associated with that model histogram. The extracted region's histogram can also be stored as an additional model histogram associated with the designated person or object and assigned to the cell in which the centroid of the corresponding extracted region resides. Each of the aforementioned locations in the image of the scene can thus be associated with its own set of stored model histograms. This would for example account for differences in the lighting conditions at different locations within the scene which could cause an extracted region's histogram to vary significantly, and so not match the model histogram associated with the person or object. The preferred conditions under which the region histogram is stored as an additional model histogram in the refined system and process will be discussed later in this summary. As with the basic process, when an extracted region's histogram does not exhibit a degree of similarity to any of the previously identified model histograms, which exceeds the prescribed threshold, it is designated as corresponding to the person or object of unknown identity, and ignored. In addition, as with the basic object recognition technique, it is preferred that the refined system and process be repeated for subsequently generated images of the scene, and that color images and color histograms be employed.

The preferred conditions under which a region histogram is stored as an additional model histogram in the refined system and process are as follows. It is first determined for each extracted region whether a histogram associated with the person or object corresponding to the histogram derived from the extracted region was previously stored and assigned to the cell containing the centroid of the extracted region. If such a histogram was not previously stored and assigned, then the histogram derived from the extracted region is stored as an additional model histogram and assigned to the cell containing the centroid of the extracted region. Whenever it is determined that a histogram associated with the person or object corresponding to the histogram derived from the extracted region was previously stored and assigned to the cell containing the centroid of the extracted region, the following additional process actions can be performed. First, the time when the previously stored histogram was stored and assigned is identified. It is then ascertained whether the previously stored histogram was stored within a prescribed threshold time frame in comparison to the current time. If it is determined that the previously stored histogram was not stored within the prescribed threshold time frame, then the histogram derived from the extracted region is stored as an additional model histogram and assigned to the cell containing the centroid of the extracted region. It is noted that in this storage criteria, more than one histogram could be created and stored for each person at each location. This would account for changes in the lighting conditions at a location over the course of the day.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
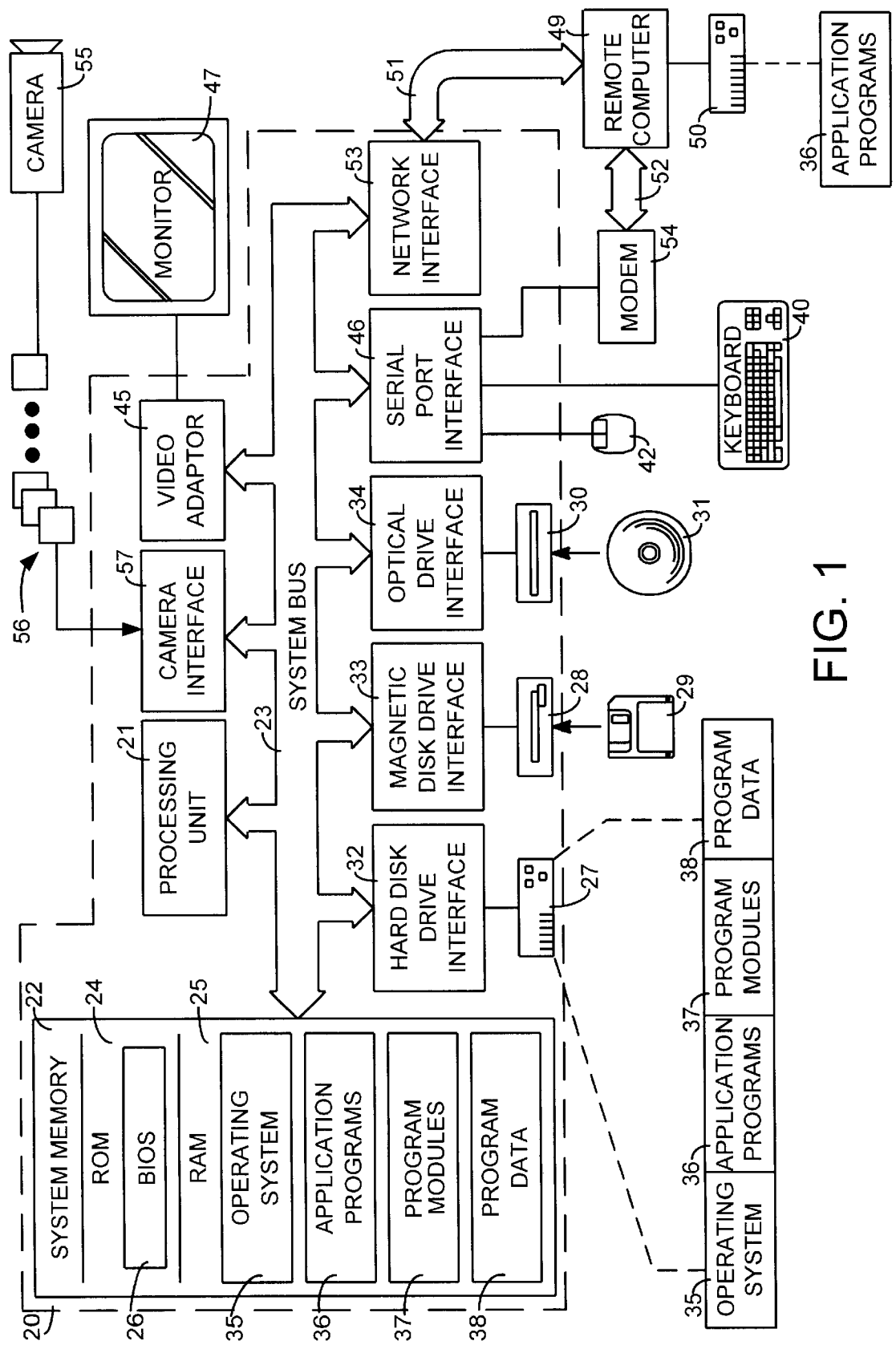
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules and processes embodying an object recognition technique that identifies people or objects of interest in a scene based on images of the scene. These images preferably take the form of color images of a scene containing people and objects of interest. For example, the images could be a continuous temporal sequence of color images taken with an appropriate color video camera held at a fixed position with a view of the scene being monitored.

1.0 The Basic Object Recognition Process.

Figure 2:
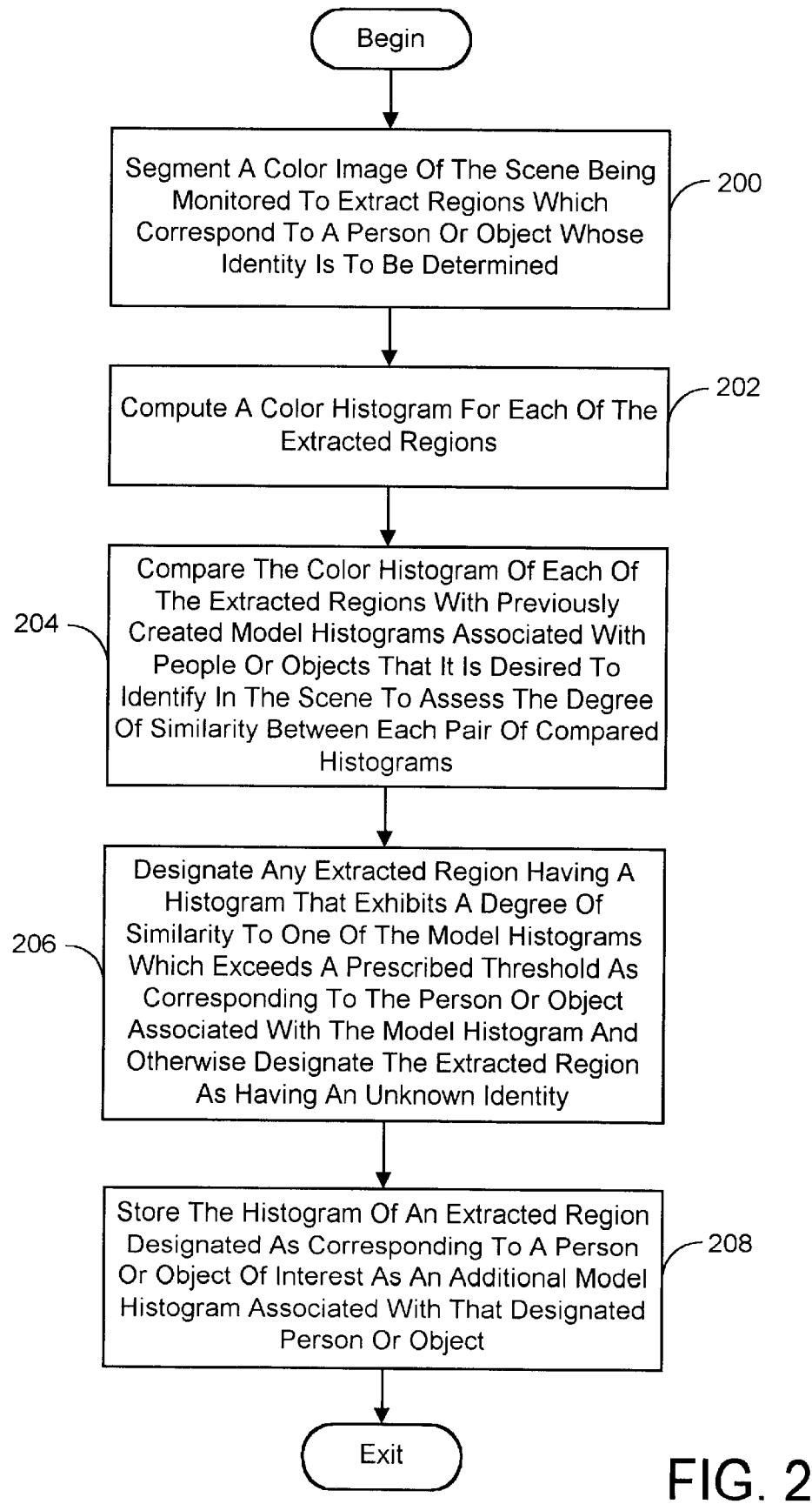
FIG. 2 is a block diagram of an overall object recognition process for identifying people and objects in an image of a scene according to the present invention.

The general process will be explained first, then an improved process will be discussed. Referring to FIG. 2, the first process action 200 in the general object recognition process involves segmenting a color image of the scene being monitored to extract regions which likely correspond to a person or object whose identity is to be determined. Next, in process action 202, a color histogram is computed for each of the extracted regions. In process action 204, a comparison is made between the color histogram of each of the extracted regions and previously created model histograms associated with people or objects that it is desired to identify in the scene. The results of this comparison are used to assess the degree of similarity between each pair of compared histograms. As will be explained in more detail below, these model histograms are created by segmenting a model image and computing a histogram for each segmented region which is known to correspond to a person or object that it is desired to identify in subsequently generated images of the scene. In process action 206, any extracted region having a histogram that exhibits a degree of similarity to one of the model histograms which exceeds a prescribed threshold is designated as corresponding to the person or object associated with the model histogram. Thus, the designated people and objects are identified in the image of the scene currently being analyzed. If the histogram associated with an extracted region does not match any of the model histograms to the degree that the aforementioned threshold is exceeded, then the region is designated as having an unknown identity. The process continues with the histogram of an extracted region designated as corresponding to a person or object of interest being stored as an additional model histogram associated with that designated person or object (process action 208). As will be described in greater detail later, the purpose of this last action is to capture histograms of a person or object under different lighting conditions than the original model, such as might occur in different parts of the scene or at different times of the day. This improves the chances of finding a match in future images of the scene.

Figure 3:
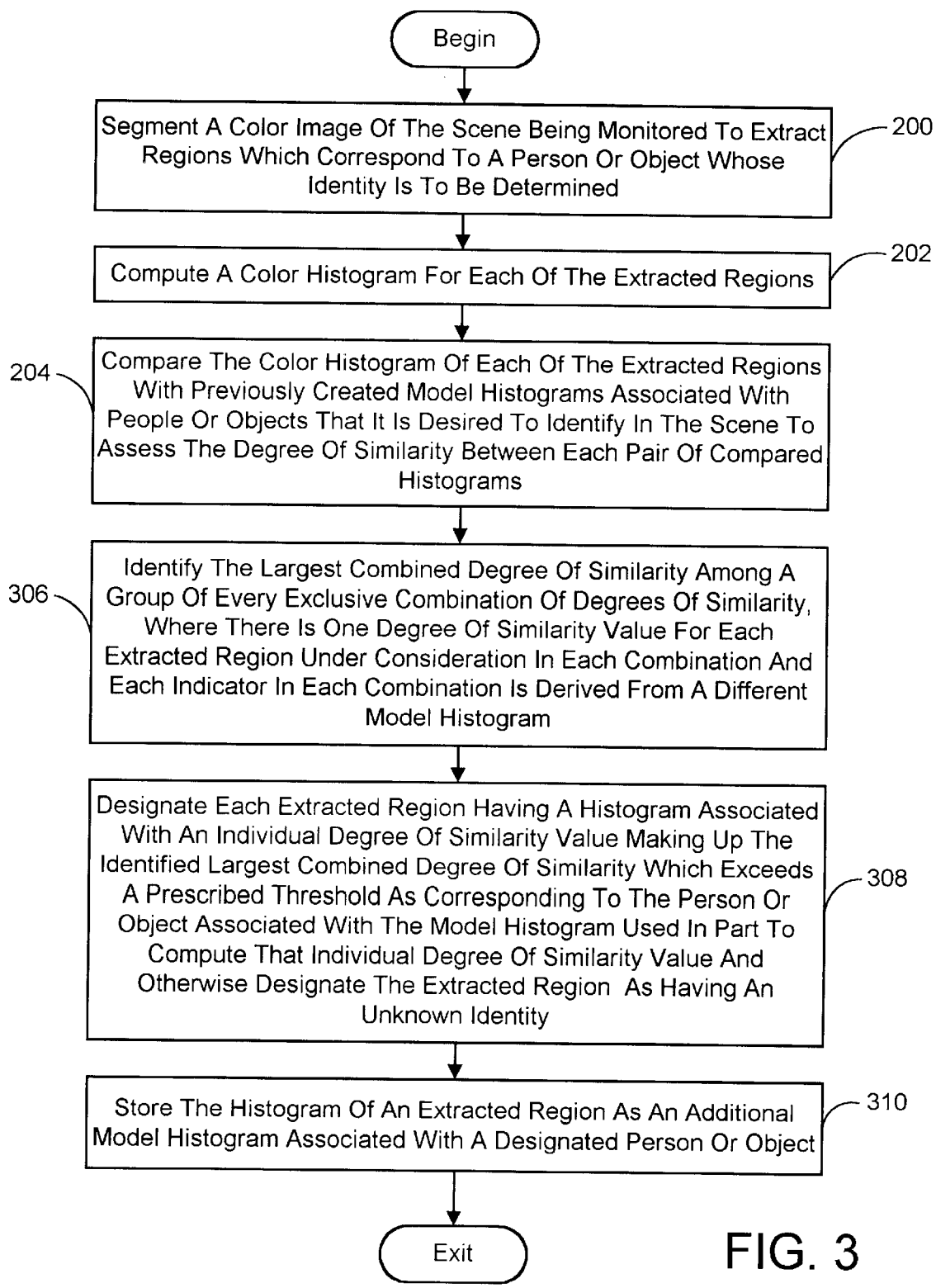
FIG. 3 is a block diagram of an improved overall object recognition process for identifying people and objects in an image of a scene according to the present invention.

While the foregoing general process is sufficient for most applications, it is believed the portion of the process concerned with assessing the similarity between each pair of compared histograms can be improved by taking a set of matches that maximizes the sum of match qualities rather than just first reporting the best match, then the next best, and so on. In other words, every combination of possible exclusive extracted region histogram-to-model histogram match combinations are considered to find the best overall match combination. As shown in FIG. 3, the first part of this improved process is identical to the above-described general process in that the same segmenting procedure (process action 200), color histogram computation procedure (process action 202), and comparison procedure (process action 204) are employed. However, the remaining actions are modified to accommodate the improved similarity assessment. Specifically, in process action 306, a largest of the combined degree of similarity values is identified among every exclusive combination of the degrees of similarity computed for the extracted regions (where there is one degree of similarity value for each extracted region under consideration in each combination and each value in the combination is derived from a different model image). In process action 308, each extracted region having a histogram associated with an individual degree of similarity making up the aforementioned largest combined degree of similarity which exceeds a prescribed threshold is designated as corresponding to the person or object associated with the model histogram used in part to compute that individual degree of similarity. In addition, those extracted regions associated with a degree of similarity making up the largest combined degree of similarity which did not exceed threshold can be designated as having an unknown identity. The process can also continue with the histogram of an extracted region being stored as an additional model histogram associated with a designated person or object (process action 310).

Regardless of whether the general or improved overall process is used, it is preferable that the process be repeated for subsequently generated color images of the scene, so that the identity of people and objects can be monitored over time as they move into and about the scene.

1.1 Segmenting a Color Image of the Scene.

As indicated above, the color images of the scene must be segmented to extract those areas of interest, i.e., regions that correspond to a person or object in the scene. Any conventional image segmentation method can be employed for this purpose. However, it is preferred that the unique segmentation processes described in a co-pending application assigned to the common assignee hereto and entitled "A SYSTEM AND PROCESS FOR LOCATING AND TRACKING A PERSON OR OBJECT IN A SCENE USING A SERIES OF RANGE IMAGES", be employed. This co-pending applications was filed on Dec. 6, 1999 and assigned Ser. No. 09/455,822.

Essentially, the aforementioned segmentation process entails first generating the series of range images. Preferably, the series of range images is a continuous temporal sequence of depth maps of the scene, such as might be captured using a video-rate stereo imaging system or a laser range finder system. A background image is computed from a block of these range images. In general, this involves identifying pixel locations in the block of range images that represent a static portion of the scene (i.e., pixels that do not change appreciably over the period of time represented by the block of range images). These "static" pixel locations are collectively designated as the background image. Once the background image has been computed, a range image generated subsequent to the aforementioned block of range images is selected for processing. The background image is subtracted from this currently selected range image to produce a foreground image. The foreground image is next segmented into regions, each of which represents a different person or object of interest in the scene captured by the currently selected range image. This is essentially accomplished by identifying regions in the foreground image made up of pixels exhibiting smoothly varying depth values. In addition, any region having an actual area too small to represent a person or object of interest is eliminated.

An intensity image of the scene (e.g., a color image in the preferred case of the present invention) is captured contemporaneously with the generation of the aforementioned selected range image. Each region of the color image that corresponds to a segmented region in the foreground image is identified and designated as one of the aforementioned extracted regions corresponding to a person or object of interest in the scene.

1.2. Computing Color Histograms for Each Extracted Region.

As discussed previously, a color histogram is preferably computed for each of the aforementioned extracted regions of the color image. Essentially, the color histogram is simply a record of how many pixels in an extracted region exhibit the same "color".

It is noted that for the purposes of explaining the present invention, the "color" of each image pixel will be defined using the conventional red, green, blue (RGB) characterization of the color space—i.e., a three-dimensional color space represented by red, green and blue color axes where the color of an image pixel is defined by its respective red, green and blue intensity values. However, it is not intended that the present invention be limited to such a representation. Rather, any standard characterization can be used to define the color of the image pixels. For example, characterizations based on the hue, saturation and Y-luminance channel, among others, would be appropriate alternatives.

In addition, for the purposes of the present invention, a pixel's actual color is quantized before computing the color histogram. Thus, instead of using the entire RGB color space that the pixels can represent ($256^3$=16,777,216 possible colors), a smaller set of color ranges is employed. This quantization of the pixel colors could be skipped, if desired, but at the expense of increased processing requirements. Further, it is believed that the precision of histograms based on a reasonable quantization of the pixel colors will not suffer as long as a reasonable number of color ranges are employed. For example, in a tested embodiment of the present object recognition system, 27 color ranges were chosen and provided acceptable results.

The quantization is accomplished by dividing the RGB color space into regions. In the preferred method, each of the three RGB axes is divided into $n_c$ adjoining, nonoverlapping subsections giving $n_c^3$ cuboid regions in the RGB color space. These subsections or ranges correspond to 3D blocks in the 3D color space, with each block representing one quantized color. Each pixel is then assigned to a quantized color by mapping its actual color to the 3D region into which it falls in the quantized color set $C=\{c_1, c_2, \ldots, c_{n_c}{}^3\}$. Preferably the chosen color ranges are equal in size, although this need not be the case.

Figure 4:
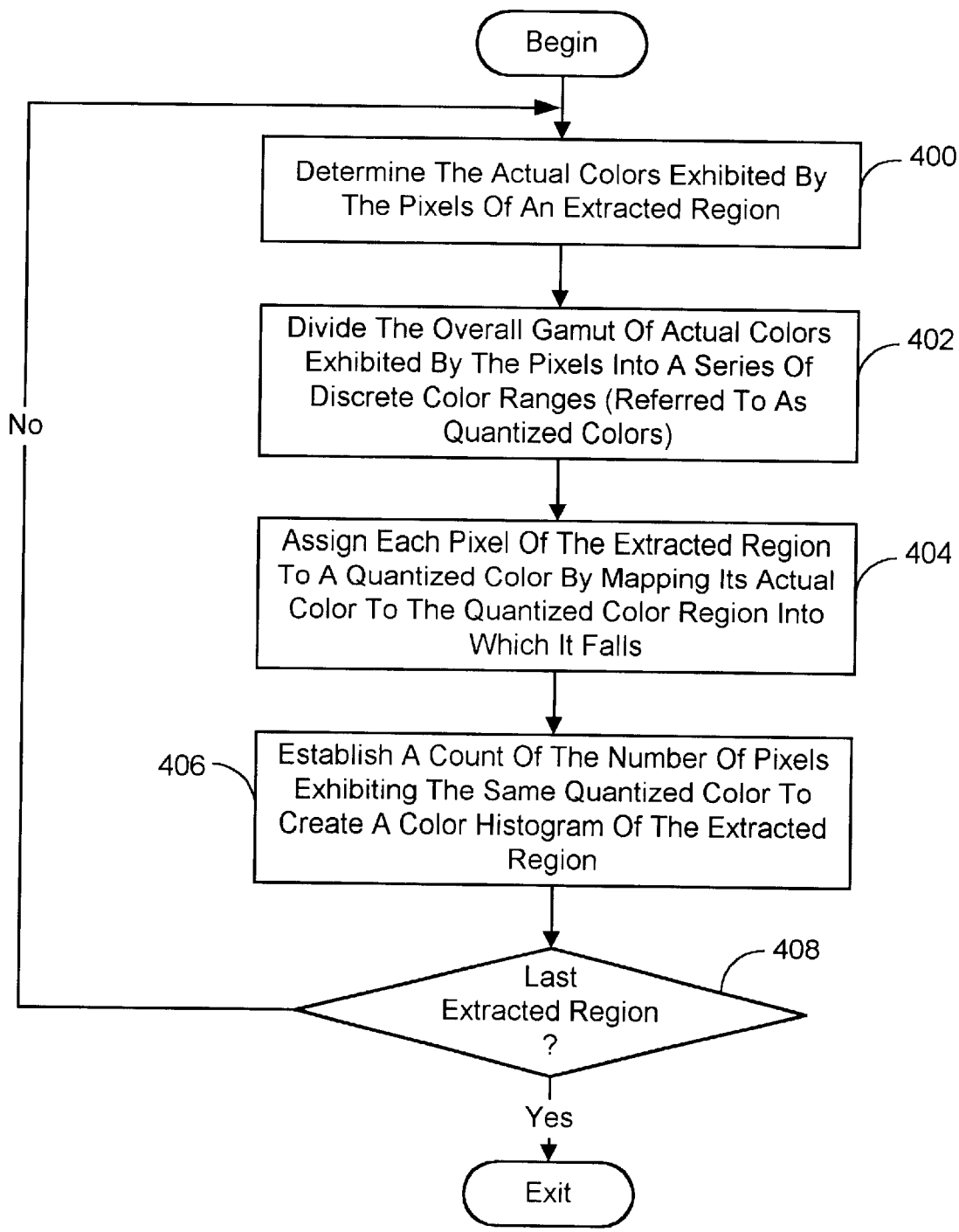
FIG. 4 is a block diagram of a process for accomplishing the modules of the overall process of FIG. 2 or 3 involving the creation of model histograms and the computation of histograms for each region extracted from the image of the scene.

In practice, computing a color histogram of an extracted region from a color image is preferably accomplished via the process illustrated in FIG. 4. In the first process action 400, the actual colors exhibited by the pixels of the extracted region are determined. The overall gamut of actual pixel colors is then divided into a series of discrete color ranges, referred to as quantized colors or quantized color categories (process action 402). Each pixel of the extracted region is then assigned to a quantized color by mapping its actual color to the quantized color region into which it falls (process action 404). Once the pixels of the extracted region are assigned to one of the quantized colors, the next action 406 in the process is to establish a count of the number of pixels exhibiting the same quantized color. These counts represent the color histogram of the extracted region. This process is then repeated for each remaining extracted region as indicated by process action 408.

1.3 Comparing the Color Histogram of each Extracted Region to Previously Created Model Histograms.

The object recognition process continues with a comparison between the color histogram computed for each of the extracted regions and a set of previously created model histograms. Each of the model histograms is preferably a color histogram representing people or objects that it is desired to identify in the scene. Essentially, these model histograms are computed as described above in connection with the current or "live" color image of the scene, except they are obtained beforehand whenever an opportunity arises where it is known that a particular region in an image belongs to a particular person or object. These model histograms are then stored for comparison to the histograms computed for the extracted regions in a current color image of the scene. The images from which the model histograms are derived can be captured at any time before the analysis of the current image, and in any appropriate manner desired. One example of how this might be accomplished for persons entering the scene is that each person entering would be required to "sign-in" in some manner at a particular location. Thus, the system would have the opportunity to use an image captured at the sign-in location to create a color histogram and associate the histogram to the person based on the sign-in information.

Figure 5:
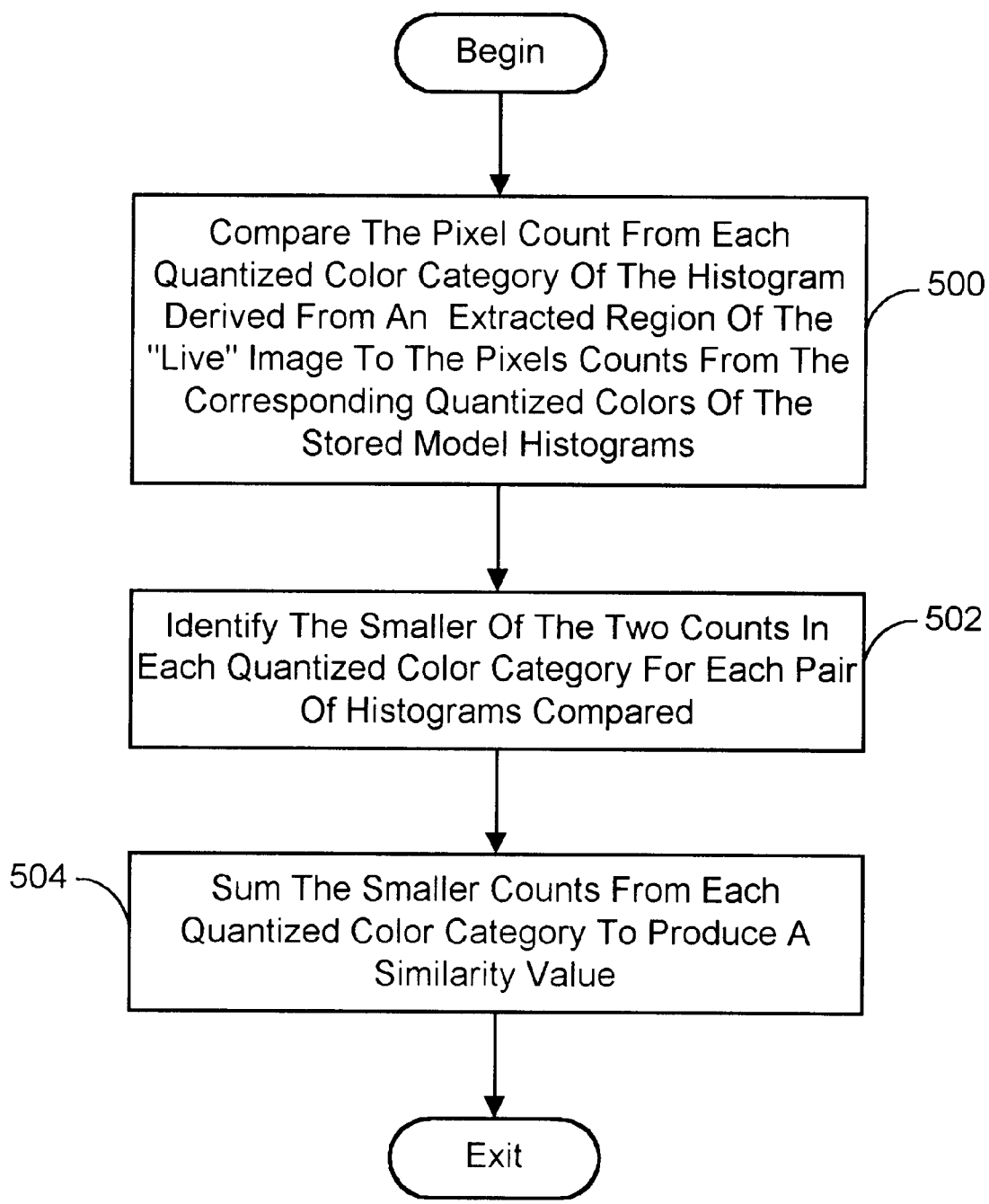
FIG. 5 is a block diagram of a process for accomplishing the module of the overall process of FIG. 2 or 3 involving the assessment of the degree of similarity between a histogram of an extracted region and each of the model histograms.

Each color histogram computed from the extracted regions of the "live" image is compared to the set of stored histograms to assess the degree of similarity. The preferred approach for assessing similarity between a histogram computed from the live image and a stored histogram is via a standard intersection analysis. Specifically, as illustrated in FIG. 5, the pixel count of each corresponding quantized color of each pair of histograms (i.e., one derived from the "live" image and one associated with the stored histograms) is compared (process action 500). The purpose is of this comparison is to identify the smaller of the two counts in each color category, as indicated in process action 502. The identified smaller counts from each color category are added together to produce a similarity value (process action 504). Essentially, the larger this similarity value, the greater the similarity between the compared histograms.

It is noted that two matching images of an object will have a larger similarity value than non-matching images because the smallest count from each category will be nearly as large as the larger count, whereas the smaller count in non-matching images is likely to be significantly smaller than the larger value. Thus, the sum of the smaller counts from matching images should be larger than the sum for non-matching images.

1.4 Determining if a Match Exists Between a Model Histogram and a Histogram Derived from a "Live" Image of the Scene.

Once the degree of similarity between the histogram associated each of the regions extracted from the current image and each of the model histograms is established, the process turns to determining whether a match exists between any of the compared histograms. As discussed previously, this can be accomplished in two different ways. The first method, which corresponds to the aforementioned general process, is as follows.

Figure 6:
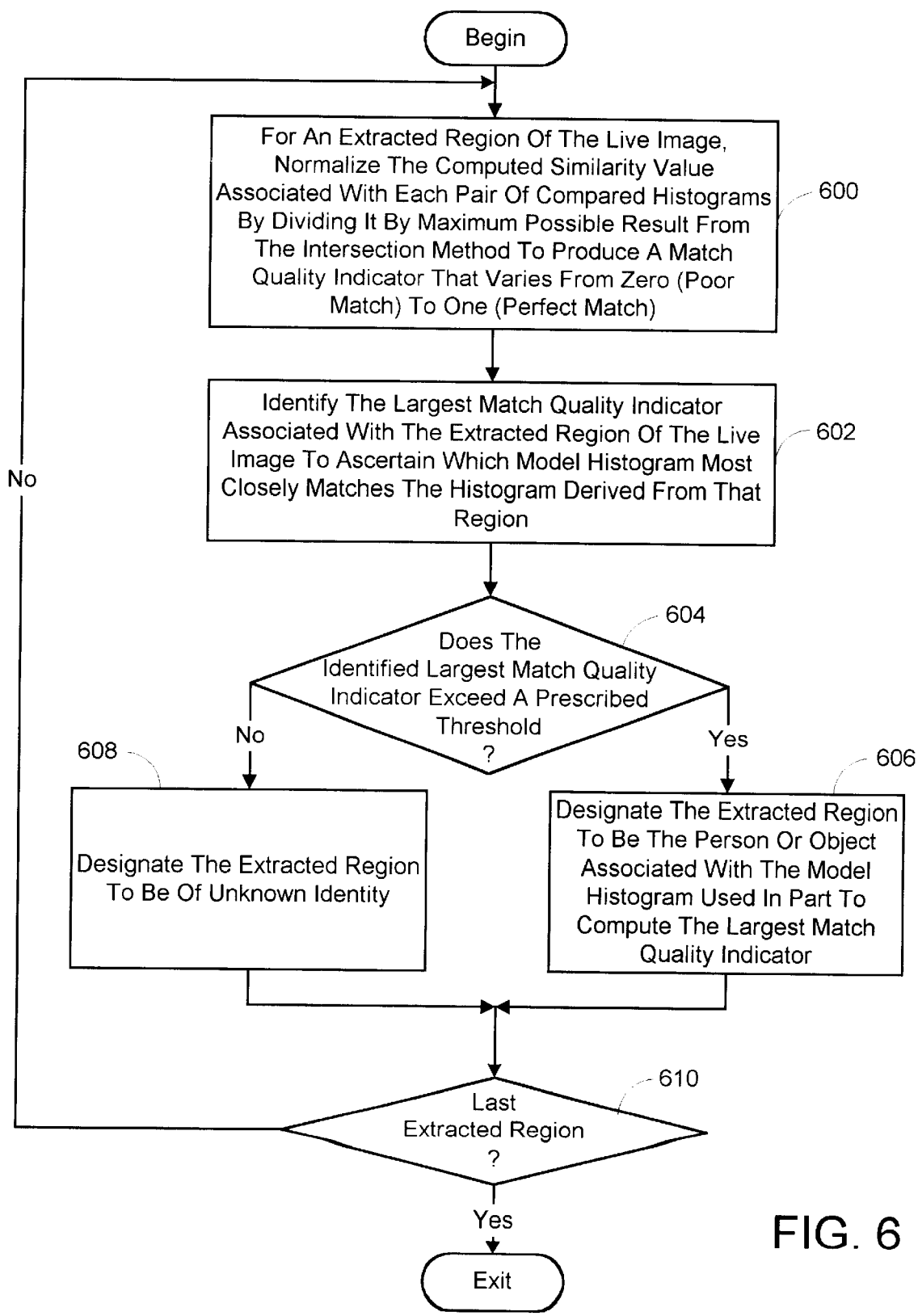
FIG. 6 is a block diagram of a process for accomplishing the module of the overall process of FIG. 2 involving the designation of an extracted region as corresponding to the person or object associated with that model histogram, or a person or object of unknown identity.

Referring to FIG. 6, the determination is preferably accomplished for each of the histograms associated with an extracted region of the live image by first normalizing the computed similarity value associated with each pair of compared histograms by dividing it by the maximum possible result from the intersection method (process action 600). In this way, a match quality indicator is created that varies from zero (poor match) to one (perfect match).

An exclusionary approach is used in determining if a match corresponds to a particular person or object in that it is assumed a single histogram derived from the live image cannot represent more than one person or object. Given this assumption, the next action 602 in the process is to ascertain which model histogram most closely matches the histogram derived from the live image. This is accomplished by identifying the largest match quality indicator associated with a particular extracted region of the live image.

As indicated in process action 604, it is next determined whether the identified largest match quality indicator exceeds a prescribed threshold. This thresholding limitation is established to prevent false identifications and is set as required in view of the accuracy desired for the system. It is believed that the chosen threshold value could range from a lower limit of 0.4 to 0.6, all the way to 1.0 if desired. For example, in a tested embodiment a match quality indicator threshold of 0.6 was employed with satisfactory results. An extracted region of the live image is designated to be the person or object associated with the model histogram used in part to compute the aforementioned largest match quality indicator if the indicator exceeds the threshold (process action 606). However, if no match exceeding the threshold is found, the extracted region being analyzed is designated as having an unknown identity (process action 608).

The process of matching an extracted region of the live image to a particular person or object is repeated for each extracted region until all the regions are identified or no match exceeding the aforementioned threshold can be found, as indicated by process action 610.

The other preferred matching or identification module for determining whether a match exists between any of the compared histograms generally entails process actions 306 and 308 of FIG. 3. More specifically, this module also involves normalizing the computed similarity value associated with each pair of compared histograms by dividing it by the maximum possible result from the intersection method. One of these indicators is generated from the comparison of each model histogram to each histogram associated with the live image, to produce a "match matrix". Essentially, this matrix describes how closely each of the regions segmented from the live image matches each of the models, respectively. For example, suppose the were three extracted regions identified and three stored model histograms. In addition, suppose the comparisons of the three histograms associated with the extracted regions (ERH) to the model histograms (MH) produced the matrix of match quality indicators shown in Table 1.

TABLE 1

|       | MH 0 | MH 1 | MH 2 |
|-------|------|------|------|
| ERH 0 | 0.4  | 0.9  | 0.7  |
| ERH 1 | 0.1  | 0.8  | 0.3  |
| ERH 2 | 0.1  | 0.2  | 0.1  |

As mentioned earlier, an exclusionary approach is used in determining if a match corresponds to a particular person in that it is assumed a single histogram derived from the live image cannot represent more than one person. Thus, as in the previous approach, the model histogram that most closely matched a histogram derived from the live image as indicated by the largest match quality indicator in the matching matrix was selected, and the region of the live image corresponding to the extracted region was designated to be the person associated with that model if the indicator exceeded the aforementioned threshold and no other region has a higher indicator. This identification approach can be illustrated with reference to the example of Table 1. Suppose the threshold is set at 0.4. In such a case, the model histogram MH 1 would be deemed to match the extracted region histogram ERH 0, and the person or object associated with that model histogram would be declared as corresponding to the extracted region associated with ERH 0. The other extracted histograms (i.e., ERH 1 and ERH 2) would remain unidentified because none of the associated match quality indicators corresponding to the remaining model histograms (i.e. MH 0 and MH 2) would exceed the example threshold.

It is noted in reference to Table 1 that the above identification method ignores the fact that the extracted region histogram ERH 0 also has a large, above-threshold match to the model histogram MH 2, and that the extracted region histogram ERH 1 has a large, above-threshold match to model histogram MH 1. It may be that the extracted region associated with ERH 0 corresponds to the person or object associated with MH 2, and the extracted region associated with ERH 1 corresponds to the person or object associated with MH 1. In view of this, it is believed the just described general matching process can be improved.

As indicated earlier, it is believed the matching process can be improved by taking the set of matches that maximizes the sum of match qualities rather than just first reporting the best match, then the next best, and so on. Thus, every combination of possible exclusive extracted region histogram-to-model histogram match combination is considered to find the best overall match combination. This is not an overwhelming task as the number of histograms (i.e., persons in the scene) to match is usually small. The best overall match combination is found by adding all the match indicators in a combination together and determining the largest sum. The combination associated with the largest sum then identifies which of the live image regions correspond to which persons, assuming the associated match indicator exceed the aforementioned threshold.

Accordingly, in regard to the example illustrated by Table 1, the following combinations are possible as shown in Table 2 where the notation "(X):(Y)" is employed as shorthand for the match quality indicator derived from the comparison of extracted region histogram ERH (X) to model histogram MH (Y).

TABLE 2

(0:0, 1:1, 2:2) --> 0.4 + 0.8 + 0.1 = 1.3
(0:0, 1:2, 2:1) --> 0.4 + 0.3 + 0.2 = 0.9
(0:1, 1:0, 2:2) --> 0.9 + 0.1 + 0.1 = 1.1
(0:1, 1:2, 2:0) --> 0.9 + 0.3 + 0.1 = 1.3
(0:2, 1:0, 2:1) --> 0.7 + 0.1 + 0.2 = 1.0
(0:2, 1:1, 2:0) --> 0.7 + 0.8 + 0.1 = 1.6

The combination having the largest sum is the (0:2, 1:1, 2:0) combination with a combined match quality indicator of 1.6. The combination indicators 0:2 and 1:1 both exceed the example threshold of 0.4. Thus, the extracted region associated with ERH 0 would be deemed to correspond to the person or object associated with MH 2, and the extracted region associated with ERH 1 would be deemed to correspond to the person or object associated with MH 1, just as conjectured previously. Since the match quality indicator associated with the 2:0 comparison does not meet the example threshold, the extracted region associated with ERH 2 would remain unidentified.

The same process can be used even if there are more model histograms than extracted region histograms. In fact, as will be discussed later, this is likely to be the case. The process could also be used when there are more extracted regions histograms than model histograms, with the caveat that any number of extracted regions in excess of the number of model histograms will result in at least that many unidentified regions because the person or object associated with each model histogram can only correspond to one of the extracted regions.

Figure 7:
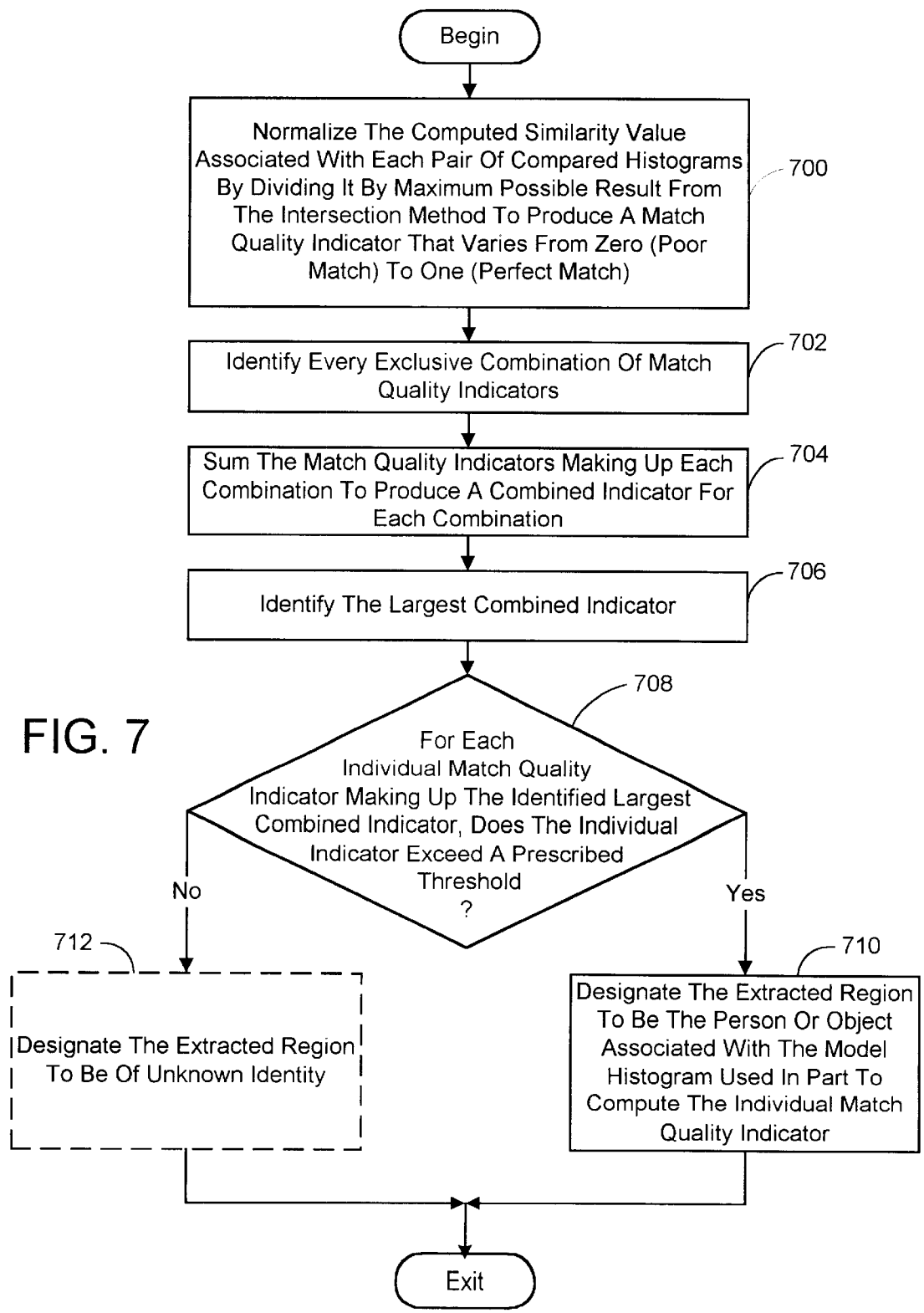
FIG. 7 is a block diagram of a process for accomplishing the module of the overall process of FIG. 3 involving the designation of an extracted region as corresponding to the person or object associated with that model histogram, or a person or object of unknown identity.

Referring to FIG. 7, the aforementioned matching or identification module of the object recognition process is preferably accomplished as follows for each of the histograms associated with an extracted region of the current image of the scene. In process action 700, the computed similarity value associated with each pair of compared histograms is normalized by dividing it by the maximum possible result from the intersection method to produce a match quality indicator. These indicators form the aforementioned match matrix where each extracted region histogram is associated with a separate match quality indicator indicative of its closeness to each of the stored model histograms. Next, every possible exclusive combination of these indicators is computed in process action 702. The term exclusive combination refers to a group of indicators, one for each extracted region histogram being considered, where each indicator is associated with a different one of the model histograms. The indicators in each combination are summed to produce a combined match quality indicator for each combination in process action 704. Then, in process action 706, the largest combined indicator is identified, and in action 708 it is determined for each individual indicator used in computing the identified largest combined indicator, whether it exceeds the aforementioned match threshold.

Each extracted region of the live image whose histogram was used to compute an indicator making up the largest combined indicator which exceeds the prescribed threshold, is designated as being the image of a person associated with the model image whose histogram was also used to compute the indicator (process action 710). In addition, if desired, any extracted region whose histogram was used to compute an indicator making up the largest combined indicator, and which does not exceed the threshold, can be designated as having an unknown identity (process action 712).

1.5 Storing Histograms Associated with Extracted Regions of the Live Image as Additional Model Histograms.

As indicated previously, the object recognition process can also include storing the histogram of each extracted region which has been designated as corresponding to a person or object of interest as an additional model histogram associated with that designated person or object. The reason for this is that varying illumination conditions typically found throughout a scene can alter the histogram as the apparent colors tend to change. By storing additional histograms of a person or object in different parts of the room, the system becomes more robust to position related illumination variations. The same is true where the foregoing object recognition process is repeated periodically with new color images to track people and objects as they move about the scene over time. Lighting conditions can change in a scene over the course of a day. Thus, even if a person or object is in the same location for extended periods of time, the illumination conditions, and so the computed histograms, might change. By storing additional histograms periodically, these changes are captured and the chances of an accurate identification are improved no matter what the time of day, or where in the scene a person or object resides when the current image being analyzed was captured.

1.6 The Refined Object Recognition Process Using an Image Cell Approach.

Figure 8A:
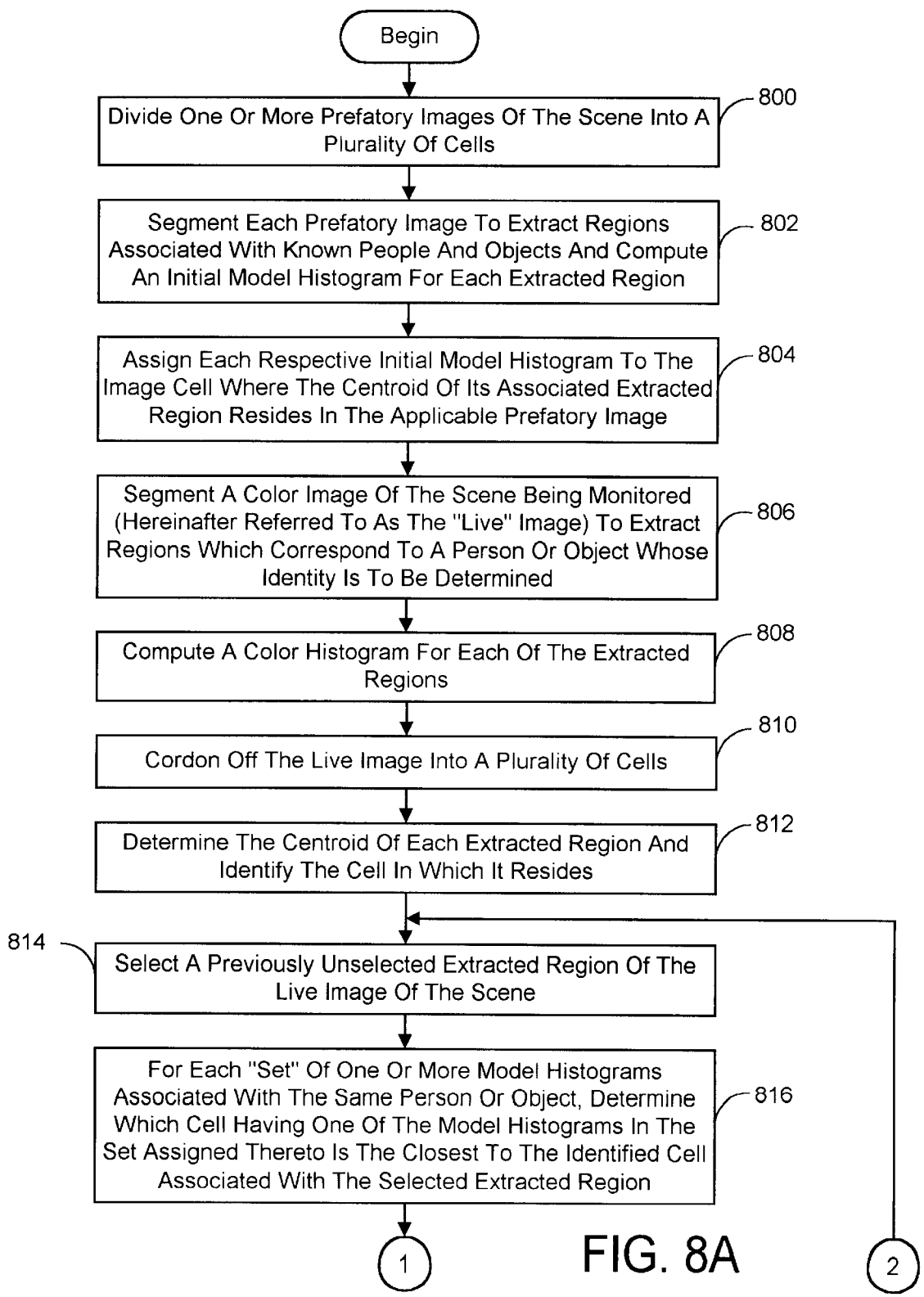
FIGS. 8A and 8B are block diagrams of a refined object recognition process for identifying people and objects in an image of a scene according to the present invention.
Figure 8B:
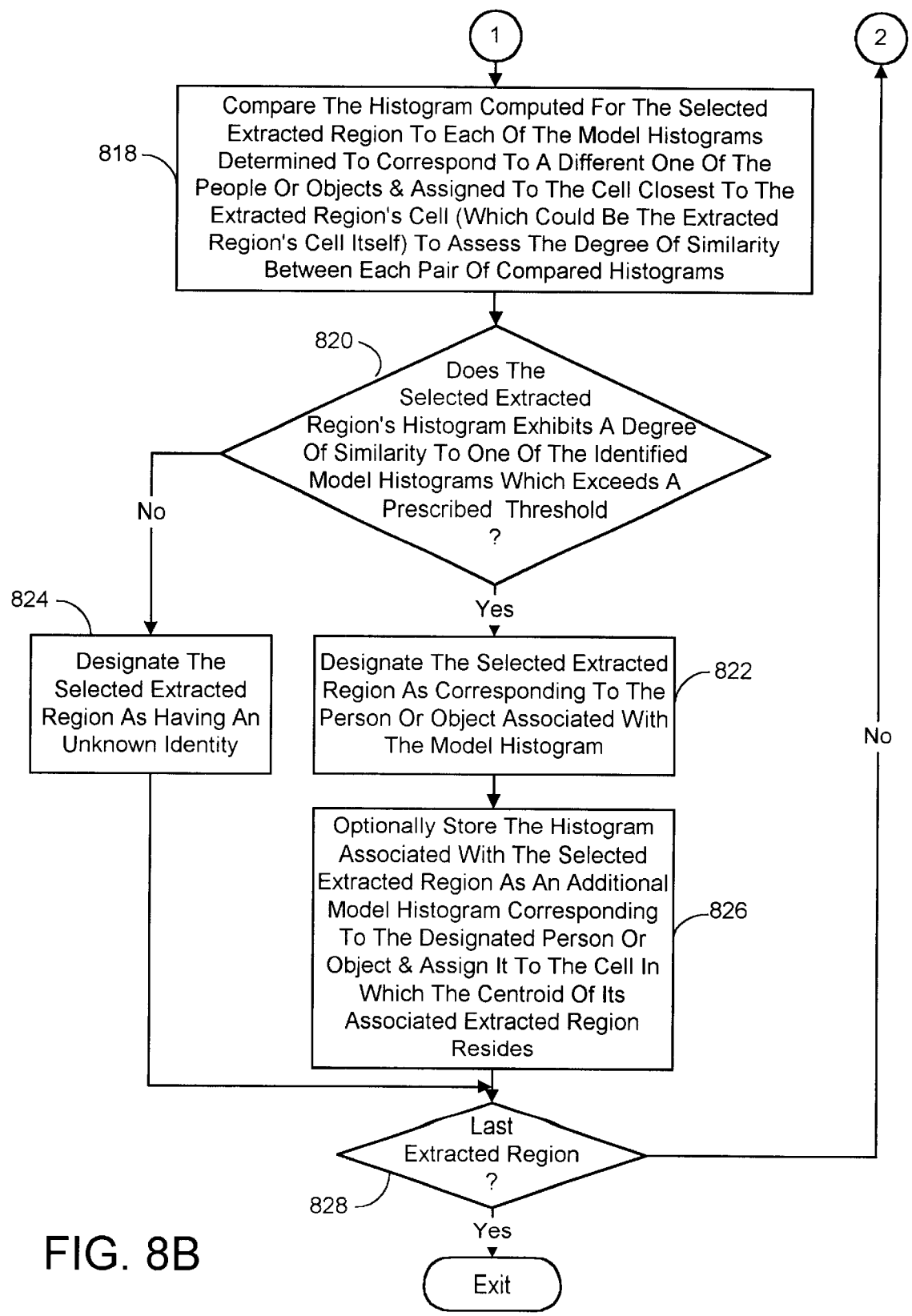

The present invention also encompasses a refined system and process for identifying people and objects in an image of a scene. This refined process begins as does the previously described basic process (i.e., either the general process or the improved general process) with the creation of initial model histograms of the people and objects that it is desired to identify in "live" images of the scene. However, referring to FIGS. 8A and 8B, the refined process this is preferably accomplished by first dividing one or more prefatory images of the scene into a plurality of cells (process action 800). For example, in a tested embodiment each image was split into 100 equal-sized, block-shaped, cells to form a 10×10 matrix. Each of the initial model histograms is created from a region extracted from a prefatory image which is known to depict a particular person or object of interest (process action 802). The foregoing extraction and histogram creation procedures are accomplished in the same manner as discussed above in connection with the description of the basic object recognition process. The initial model histograms are then assigned in process action 804 to the image cell where the centroid of their associated extracted regions reside. This last action is based on the premise that a person or object is considered to be in a cell if the centroid of the extracted region associated with that person or object is located in the cell.

Once the initial model histograms are created and assigned to the appropriate cell, the processing of "live" images of the scene can begin. Here again the segmentation of the live image to extract regions likely to depict a person or object of interest (process action 806) and the creation of a histogram from each extracted region (process action 808) proceeds as discussed previously. However, the refined process differs from the basic process in that the live image is also divided into the aforementioned plurality of cells (process action 810). The centroid of each extracted region is then determined, as well as the cell in which the centroid resides, via conventional methods in process action 812. Once the centroid and cell locations have been established, the next action 814 in the refined process is to select a previously unselected one of the extracted regions of the live image. Next, for each "set" of model histograms associated with the same person or object, it is determined which cell having one of the model histograms in the set assigned to it is the closest to the identified cell associated with the selected extracted region. (process action 816). For purposes of this description, the term "set" can mean one or more model histograms. Then, in process action 818, the desired assessment technique (i.e., either that associated with the general process or the improved general process) is utilized to compare, and assess the similarity between, the histogram computed for the selected extracted region and each of the model histograms determined to correspond to a different one of the people or objects of interest and assigned to the cell closest to the identified cell (which of course could be the identified cell itself). Thus, only a select few of the stored model histograms are compared to the extracted region, rather than assessing the degree of similarity to all the stored model histograms. It is then determined whether the selected region's histogram exhibits a degree of similarity to one of the identified model histograms which exceeds the aforementioned threshold, as indicated by process action 820. If, it is determined that an extracted region's histogram exhibits a degree of similarity to one of the model histograms which exceeds the aforementioned threshold, then the region's histogram is designated as corresponding to the person or object associated with that model histogram (process action 822). As with the basic process, when an extracted region's histogram does not exhibit a degree of similarity to any of the previously identified model histograms, which exceeds the prescribed threshold, it is designated as corresponding to a person or object of unknown identity, and ignored (process action 824). The selected extracted region's histogram can also be stored as an additional model histogram associated with the designated person or object and assigned to the cell in which the centroid of the corresponding extracted region resides (process action 826). The preferred conditions under which the region histogram is stored as an additional model histogram will be discussed later in this description. The next action 828 of the illustrated process is to ascertain whether there are any remaining extracted regions yet to be selected in the current image of the scene. If there are some remaining, then the previously described actions 814 through 826 are repeated until all of the extracted regions have been processed. If no unselected extracted regions remain, then the process ends. However, as with the basic process, it is preferable that the process be repeated for subsequently generated images of the scene, so that the identity of people and objects can be monitored over time as they move into and about the scene.

The idea behind the foregoing procedure is that while a model histogram associated with a person or object represented by the region histogram may not have been assigned to the identified cell, one may have been assigned to a neighboring cell. This may occur when a person or object of interest has never been in the part of the scene associated with the identified image cell. The aforementioned search is carried out by checking the nearest cell with an assigned model histogram associated with each person or object of interest so as to minimize the possibility that disparate illumination conditions in distance cells are such that a model histogram assigned to such a cell when compared to the region histogram being analyzed would exceed the aforementioned threshold even though the model histogram is not associated with the person or object represented by the region histogram (i.e., a false match). Such a false match scenario while probably rare can occur, especially where the illumination conditions vary radically across the scene being monitored.

The foregoing refined object recognition system and process is also advantageous as it can potentially reduce the amount of processing required to identify people and object in the image of the scene. If model histograms of people or objects residing in a particular location are stored, it becomes possible, to compare just a selected few of the model histograms most likely to match an extracted region. In most cases, the histogram associated with each person or object that is assigned to a cell closest (or the same as) the identified cell will be the one most probable to match as the illumination conditions are likely to be the most similar. If a match is found using just a few model histograms, then the required processing is reduced considerably in comparison to comparing the histogram of the extracted region to all the stored histograms.

The aforementioned preferred conditions under which a region histogram is stored as an additional model histogram generally entail storing model histograms of people or objects residing in a particular location within the scene. Each of the aforementioned locations in the image of the scene can thus be associated with its own set of stored model histograms. Separate histograms are created and stored for each person or object in each location of the scene that the person or object enters. In one version of the refined object recognition process, only one histogram per person would be stored and assigned to any one location. Thus, there would be fewer histograms to analyze during each iteration of the process, than would be the case if all the histograms derived from each extracted region during each iteration of the process were stored.

However, the foregoing version of the refined process does not account for changes in the lighting conditions at a location in the scene over the course of the day. This can be remedied by allowing more than one histogram to be stored for each person at each location. Of course, depending on the frequency that images of the scene are analyzed, limitations may have to be place on the number of histograms created for a particular person or object and assigned to the same location. If the frequency is too great, the number of histograms stored and assigned to a location could become unmanageable (i.e., increase processing requirements beyond reasonable limits). In addition, numerous model histograms of the same person or object need not be stored for the same cell because lighting conditions at a particular location within a scene typically vary slowly over the course of a day. Thus, just a few model histograms will adequately represent all the illumination conditions over a typical day. Therefore, it should be possible to place a constraint on whether a new histogram associated with a particular person or object is stored and assigned to a location based on when the last histogram associated with that person or object was stored. For example, it could be dictated that such a new histogram is stored only if the previous histogram associated with the same person or object was stored and assigned to the location in question more than a prescribed period of time in the past (e.g., about 30 minutes). Or, it might be dictated that a new histogram is stored only if the previous histogram associated with the same person or object was stored and assigned at a time of day more than a prescribed period from the current time (e.g., about 30 minutes).

Figure 9:
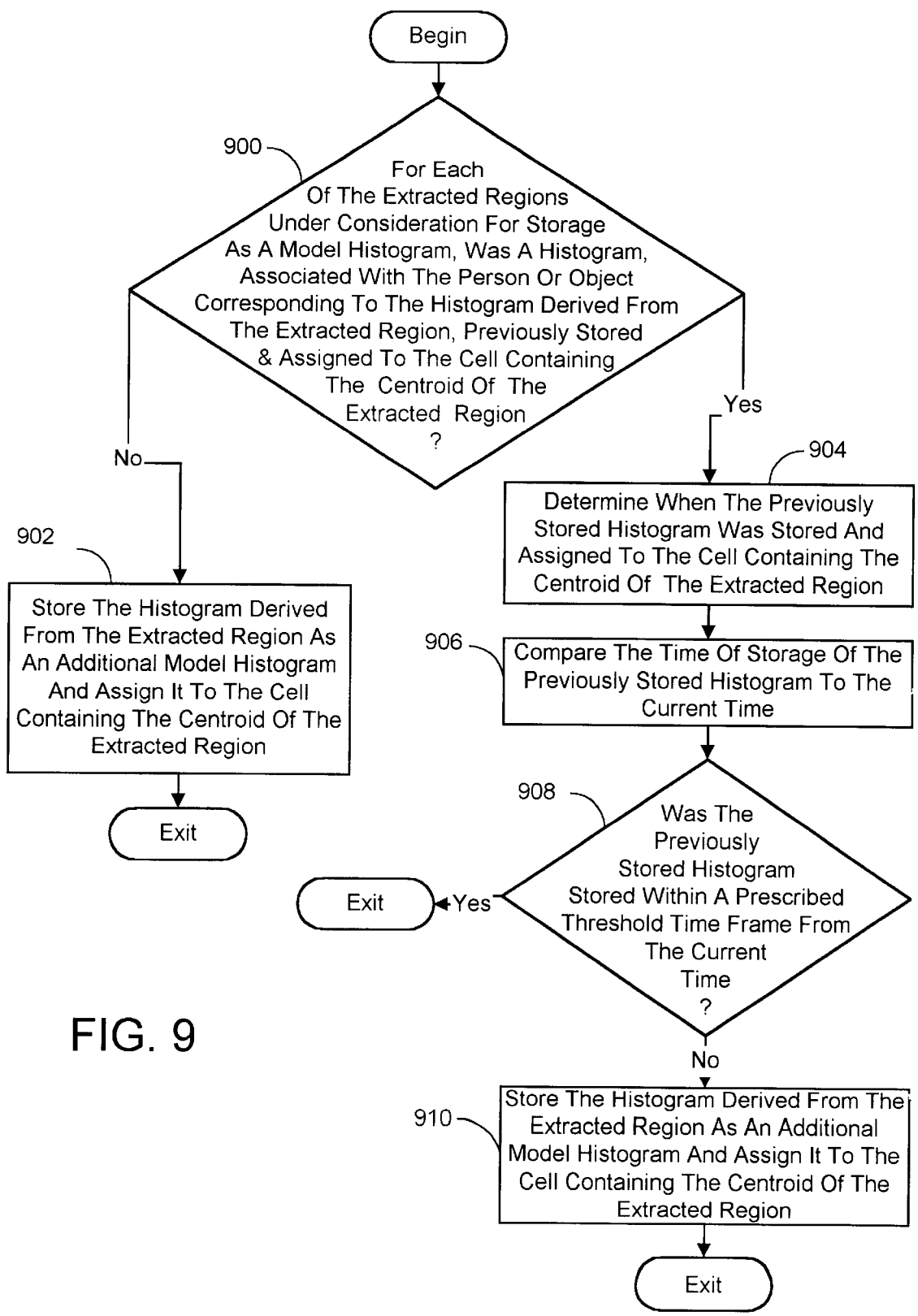
FIG. 9 is a block diagram of additional modules of the refined object recognition process of FIGS. 8A and 8B involving the storage of a histogram computed for an extracted region of the image that is designated as corresponding to a person or object as an additional model histogram.

Referring to FIG. 9, the implementation of the latter of the foregoing storage options will now be described. The storage procedure begins with action 900 which involves determining, for each region histogram under consideration for storage as a model histogram, whether a model histogram associated with the person or object designated as corresponding to the region histogram has ever been assigned to the cell in which the centroid of the associated extracted region resides. If, as indicated in process action 902, no such model histogram has ever been assigned to the identified cell, then region histogram under consideration is stored as a new model histogram and assigned to the cell. If, however, a model histogram associated with the person or object designated as corresponding to the region histogram has been previously assigned to the identified cell, then it is determined when the aforementioned previously stored histogram was stored (process action 904). The time of this storage action is compared to the current time (process action 906) and it is determined if the previously stored histogram was stored within a prescribed threshold time frame (process action 908). If the previously stored histogram was stored within the threshold time frame, the process terminates without the histogram derived from the extracted region under consideration being stored. However, as indicated by process action 910, if it was stored at a time outside the prescribed threshold time frame, then the histogram derived from the extracted region is stored as an additional model histogram and is assigned to the cell containing the centroid of the region. The process terminates after this histogram is stored. It is noted that the comparison of the time the previously stored histogram was stored to the current time could involve determining how much time has passed since the previously stored histogram was stored, or it could, for example, entail determining the difference between the time of day that the previously stored histogram was stored and the current time of day. Other characterizations of the difference between the time the previously stored histogram was stored and the current time could also be employed, as desired.

3.0 Repeating the Object Recognition Process at a Rate Sufficient to Maximize the Chances of Tracking the Identity of a Person or Object Over Time.

It is noted that a person or object previously identified via the foregoing object recognition processes may subsequently be designated as being of unknown identity due to the previously described effects of changing illumination conditions in different parts of the scene and at different times of the day. This situation may occur when the time between iterations of the object recognition process are so far apart that the previously identified person or object has moved to a location in the scene where the illumination conditions are different enough in comparison to locations where that person or object was previously identified that none of the stored histograms will match the histogram computed for that person or object from the current image. This same situation can also occur when the time between iterations is so long that the illuminations condition have changed enough to preclude a match regardless of whether the person or object of interest has moved or not. Thus, such a person or object cannot be identified until he, she or it moves into a more "familiar" location in the scene, or the illumination conditions return to ones more closely resembling those at the time the image(s) from which the model histograms were derived was captured.

However, it is believed that if the foregoing object recognition process is repeated often enough, the illumination conditions will not change enough from one image to the next to cause the aforementioned loss of identity situation to occur. Thus, it is preferred that the process be repeated at a rate which will prevent the loss of identity circumstance. For example, the color images of the scene could be captured using video camera, thus providing new images of the scene at video rates (i.e., about 30 frames per second). However, it is not believed the process would have to be repeated for every frame produced. For example, in a tested embodiment of the present invention the process was repeated at a rate of 10 images per second, without a loss of identity occurring.

4.0 Alternate Techniques.

While the invention has been described in detail by specific reference to preferred embodiments thereof, it is understood that variations and modifications thereof may be made without departing from the true spirit and scope of the invention. For example, while the foregoing description describes the use of color images and color histograms in the object recognition process, this need not be the case. In general, the disclosed process can be readily adapted to use histograms of other pixel and image characteristics. For instance, histograms based on the number of corner features or predefined types of edges within an extracted region could be used rather than pixel color. Likewise, the histograms could be based on pixel color pairs or gray level pairs. In fact any image feature amenable to histogram techniques that would tend to uniquely identify the extracted regions could be employed instead of pixel color.

Another variation could involve the use of "extrinsic" model histograms that were created from images or portions of images that are not part of the scene being analyzed. Essentially, these extrinsic models would be created ahead of time and associated with a known person or object of interest. The histograms would also be assigned to an arbitrary cell of the "live" images—perhaps one with illumination conditions similar to the source image of the extrinsic model histogram. Further, the conditions under which an extracted region would be made an additional model histogram and assigned to a cell would preferably be modified in that, any time an extracted region's histogram is determined to be a person or object currently represented by an extrinsic model histogram assigned to the cell also assigned to the extracted region's histogram, the extracted region's histogram would be used to replace the extrinsic model histogram as the model histogram associated with that person or object for that cell.

REFERENCES

[1] D. P. Huttenlocher, G. A. Klanderman, and W. J. Ricklidge, "Comparing Images Using the Hausdorff Distance," *IEEE Transactions on Pattern Analysis and Machine Intelligence*, vol. 15, pp. 850–863, 1993.

[2] Y. Lamdan and H. J. Wolfson, "Geometric Hashing: A General and Efficient Model-Based Recognition Scheme," presented at Second International Conference on Computer Vision, Tampa, Fla., 1988.

[3] S. Sclaroff and J. Isidoro, "Active Blobs," presented at Sixth International Conference on Computer Vision, Bombay, India, 1998.

[4] M. Turk and A. Pentland, "Eigenfaces for Recognition," *Journal of Cognitive Neuroscience*, vol. 3, pp. 71–86, 1991.

[5] H. Murase and S. K. Nayar, "Visual Learning and Recognition of 3-D Objects from Appearance," *International Journal of Computer Vision*, vol. 14, pp. 5–24, 1995.

[6] M. J. Swain and D. H. Ballard, "Color Indexing," *International Journal of Computer Vision*, vol. 7, pp. 11–32, 1991.

What is claimed is:

1. A computer-implemented process for identifying a person or object in an image of a scene, said process comprising using a computer to perform the following process actions:

creating model histograms of people and objects that it is desired to identify in said image of the scene;

segmenting said image to extract regions which correspond to at least one person or object whose identity it is desired to determine;

for each region extracted from the image,
  computing a histogram for the extracted region,
  respectively assessing the degree of similarity between the extracted region histogram and each of said model histograms, and
  designating each extracted region having a histogram that exhibits a degree of similarity to a one of the model histograms which exceeds a prescribed threshold as corresponding to the person or object associated with that model histogram; and storing the histogram computed for any extracted region of the image that is designated as corresponding to a person or object associated with a model histogram as an additional model histogram associated with that person or object.

2. The process of claim 1, further comprising the process actions of:

designating each extracted region having a histogram that does not exhibit a degree of similarity to any of the model histograms which exceeds the prescribed threshold as corresponding to the person or object of unknown identity.

3. The process of claim 1, further comprising the process action of repeating said segmenting, computing, assessing, designating and storing actions for successive images of the scene so as to track the identity of persons and objects in the scene over time.

4. The process of claim 1, wherein the image is a color image of the scene, and the model histograms and histograms computed for each of region extracted from the color image are color histograms.

5. The process of claim 4, wherein the process action of creating model histograms of people and objects that it is desired to identify in said image of the scene, comprises the actions of:

capturing one or more model images of the people and objects that it is desired to identify;

segmenting said model image to extract model regions which correspond to each of said people and objects whose identity it is desired to determine; and for each model region,
  determining the actual colors exhibited by the pixels of the model region;
  dividing the overall gamut of actual colors exhibited by the pixels of the extracted model region into a series of discrete color ranges, hereinafter referred to as quantized color categories;
  respectively assigning each pixel of the extracted model region to the quantized color category into which the actual color of the pixel falls, and
  establishing a count of the number of pixels of the extracted model region assigned to the same quantized color category.

6. The process of claim 5, wherein the process action of computing a histogram for each of region extracted from the image, comprises the actions of:

determining the actual colors exhibited by the pixels of the extracted region;

dividing the overall gamut of actual colors exhibited by the pixels of the extracted region into a series of discrete color ranges, hereinafter referred to as quantized color categories;

respectively assigning each pixel of the extracted region to the quantized color category into which the actual color of the pixel falls; and establishing a count of the number of pixels of the extracted region assigned to the same quantized color category.

7. The process of claim 6, wherein the process actions of dividing the overall gamut of actual colors exhibited by the pixels of the extracted model regions and extracted image regions into a series of discrete color ranges, comprises the action of employing the same quantized color categories for each.

8. The process of claim 7, wherein the process action of respectively assessing the degree of similarity between the extracted region histogram and each of the model histograms for each histogram associated with an extracted region, comprises the actions of:
respectively comparing the pixel count from each quantized color category of the histogram derived from the extracted region to the pixel count from the corresponding quantized color category of each model histograms;
identifying the smaller of the two counts in each quantized color category for each pair of histograms compared; and
summing the smaller counts from each quantized color category to produce a separate similarity value for each pair of histograms compared.

9. The process of claim 8, wherein the process action of designating each extracted region having a histogram that exhibits a degree of similarity to one of the model histograms which exceeds a prescribed threshold as corresponding to the person or object associated with that model histogram, comprises the actions of:
for each extracted region, normalizing the similarity value associated with each pair of compared histograms by dividing it by a maximum possible similarity value to produce a match quality indicator;
identify the largest match quality indicator associated with each extracted region;
for each extracted region, designating the extracted region to be the person or object associated with the model histogram used in part to compute the largest match quality indicator for that region whenever the largest match quality indicator exceeds the prescribed threshold.

10. The process of claim 2, wherein the process action of designating each extracted region having a histogram that does not exhibit a degree of similarity to one of the model histograms which exceeds the prescribed threshold as corresponding to the person or object of unknown identity, comprises the actions of:
for each extracted region, normalizing the similarity value associated with each pair of compared histograms by dividing it by a maximum possible similarity value to produce a match quality indicator;
identify the largest match quality indicator associated with each extracted region;
for each extracted region, designating the extracted region to be an unknown person or object whenever the largest match quality indicator does not exceeds the prescribed threshold.

11. An object recognition system for identifying a person or object in an image of a scene, comprising:
a general purpose computing device;
a computer program comprising program modules executable by the computing device, wherein the computing device is directed by the program modules of the computer program to,
(a) create model histograms of people and objects that it is desired to identify in said image of the scene,
(b) segment said image to extract regions which correspond to at least one person or object whose identity it is desired to determine,
(c) compute a histogram for each of region extracted from the image,
(d) for each histogram associated with an extracted region, respectively assess the degree of similarity between the extracted region histogram and each of said model histograms,
(e) designate each extracted region having a histogram that exhibits a degree of similarity to one of the model histograms which exceeds a prescribed threshold as corresponding to the person or object associated with that model histogram, and
(f) store the histogram computed for any extracted region of the image that is designated as corresponding to a person or object associated with a model histogram as an additional model histogram associated with that person or object.

12. The system of claim 11, further comprising the program modules for:
designating each extracted region having a histogram that does not exhibit a degree of similarity to any of the model histograms which exceeds the prescribed threshold as corresponding to the person or object of unknown identity.

13. The system of claim 11, further comprising a program module for repeating actions (b) through (f) for successive images of the scene so as to track the identity of persons and objects in the scene over time.

14. The system of claim 11, wherein the image is a color image of the scene, and the model histograms and histograms computed for each of region extracted from the color image are color histograms.

15. The system of claim 14, wherein the program module for creating model histograms of people and objects that it is desired to identify in said image of the scene, comprises sub-modules for:
capturing one or more model images of the people and objects that it is desired to identify;
segmenting said model image to extract model regions which correspond to each of said people and objects whose identity it is desired to determine; and
for each model region,
determining the actual colors exhibited by the pixels of the model region;
dividing the overall gamut of actual colors exhibited by the pixels of the extracted model region into a series of discrete color ranges, hereinafter referred to as quantized color categories;
respectively assigning each pixel of the extracted model region to the quantized color category into which the actual color of the pixel falls, and
establishing a count of the number of pixels of the extracted model region assigned to the same quantized color category.

16. The system of claim 15, wherein the program module for computing a histogram for each of region extracted from the image, comprises sub-modules for:
determining the actual colors exhibited by the pixels of the extracted region;
dividing the overall gamut of actual colors exhibited by the pixels of the extracted region into a series of discrete color ranges, hereinafter referred to as quantized color categories;
respectively assigning each pixel of the extracted region to the quantized color category into which the actual color of the pixel falls; and
establishing a count of the number of pixels of the extracted region assigned to the same quantized color category.

17. The system of claim 16, wherein the sub-modules for dividing the overall gamut of actual colors exhibited by the pixels of the extracted model regions and extracted image regions into a series of discrete color ranges, comprises a sub-module for employing the same quantized color categories for each.

18. The system of claim 17, wherein the program module for respectively assessing the degree of similarity between the extracted region histogram and each of the model histograms for each histogram associated with an extracted region, comprises sub-modules for:

respectively comparing the pixel count from each quantized color category of the histogram derived from the extracted region to the pixel count from the corresponding quantized color category of each model histograms;

identifying the smaller of the two counts in each quantized color category for each pair of histograms compared; and summing the smaller counts from each quantized color category to produce a separate similarity value for each pair of histograms compared.

19. The system of claim 18, wherein the program module for designating each extracted region having a histogram that exhibits a degree of similarity to one of the model histograms which exceeds a prescribed threshold as corresponding to the person or object associated with that model histogram, comprises sub-modules for:

for each extracted region, normalizing the similarity value associated with each pair of compared histograms by dividing it by a maximum possible similarity value to produce a match quality indicator;

identify the largest match quality indicator associated with each extracted region;

for each extracted region, designating the extracted region to be the person or object associated with the model histogram used in part to compute the largest match quality indicator for that region whenever the largest match quality indicator exceeds the prescribed threshold.

20. The system of claim 12, wherein the program module for designating each extracted region having a histogram that does not exhibit a degree of similarity to one of the model histograms which exceeds the prescribed threshold as corresponding to the person or object of unknown identity, comprises sub-modules for:

for each extracted region, normalizing the similarity value associated with each pair of compared histograms by dividing it by a maximum possible similarity value to produce a match quality indicator;

identify the largest match quality indicator associated with each extracted region;

for each extracted region, designating the extracted region to be an unknown person or object whenever the largest match quality indicator does not exceeds the prescribed threshold.

21. A computer-readable memory for causing a computer to perform an object recognition procedure for identifying a person or object in an image of a scene, comprising:

a general purpose computing device;

a computer program comprising program modules executable by the computing device, wherein the computing device is directed by the program modules of the computer program to, (a) create model histograms of people and objects that it is desired to identify in said image of the scene, (b) segment said image to extract regions which correspond to at least one person or object whose identity it is desired to determine, (c) compute a histogram for each of region extracted from the image, (d) for each histogram associated with an extracted region, respectively assess the degree of similarity between the extracted region histogram and each of said model histograms, (e) designate each extracted region having a histogram that exhibits a degree of similarity to one of the model histograms which exceeds a prescribed threshold as corresponding to the person or object associated with that model histogram, and (f) store the histogram computed for any extracted region of the image that is designated as corresponding to a person or object associated with a model histogram as an additional model histogram associated with that person or object.

22. The computer-readable memory of claim 21, further comprising the program modules for:

designating each extracted region having a histogram that does not exhibit a degree of similarity to any of the model histograms which exceeds the prescribed threshold as corresponding to the person or object of unknown identity.

23. The computer-readable memory of claim 21, further comprising a program module for repeating actions (b) through (f) for successive images of the scene so as to track the identity of persons and objects in the scene over time.

24. The computer-readable memory of claim 21, wherein the image is a color image of the scene, and the model histograms and histograms computed for each of region extracted from the color image are color histograms.

25. The computer-readable memory of claim 24, wherein the program module for creating model histograms of people and objects that it is desired to identify in said image of the scene, comprises sub-modules for:

capturing one or more model images of the people and objects that it is desired to identify;

segmenting said model image to extract model regions which correspond to each of said people and objects whose identity it is desired to determine; and for each model region,
 determining the actual colors exhibited by the pixels of the model region;
 dividing the overall gamut of actual colors exhibited by the pixels of the extracted model region into a series of discrete color ranges, hereinafter referred to as quantized color categories;
 respectively assigning each pixel of the extracted model region to the quantized color category into which the actual color of the pixel falls, and
 establishing a count of the number of pixels of the extracted model region assigned to the same quantized color category.

26. The computer-readable memory of claim 25, wherein the program module for computing a histogram for each of region extracted from the image, comprises sub-modules for:

determining the actual colors exhibited by the pixels of the extracted region;

dividing the overall gamut of actual colors exhibited by the pixels of the extracted region into a series of discrete color ranges, hereinafter referred to as quantized color categories;

respectively assigning each pixel of the extracted region to the quantized color category into which the actual color of the pixel falls; and establishing a count of the number of pixels of the extracted region assigned to the same quantized color category.

27. The computer-readable memory of claim 26, wherein the sub-modules for dividing the overall gamut of actual colors exhibited by the pixels of the extracted model regions and extracted image regions into a series of discrete color ranges, comprises a sub-module for employing the same quantized color categories for each.

28. The computer-readable memory of claim 27, wherein the program module for respectively assessing the degree of similarity between the extracted region histogram and each of the model histograms for each histogram associated with an extracted region, comprises sub-modules for:

respectively comparing the pixel count from each quantized color category of the histogram derived from the extracted region to the pixel count from the corresponding quantized color category of each model histograms;

identifying the smaller of the two counts in each quantized color category for each pair of histograms compared; and summing the smaller counts from each quantized color category to produce a separate similarity value for each pair of histograms compared.

29. The computer-readable memory of claim 28, wherein the program module for designating each extracted region having a histogram that exhibits a degree of similarity to one of the model histograms which exceeds a prescribed threshold as corresponding to the person or object associated with that model histogram, comprises sub-modules for:

for each extracted region, normalizing the similarity value associated with each pair of compared histograms by dividing it by a maximum possible similarity value to produce a match quality indicator;

identify the largest match quality indicator associated with each extracted region;

for each extracted region, designating the extracted region to be the person or object associated with the model histogram used in part to compute the largest match quality indicator for that region whenever the largest match quality indicator exceeds the prescribed threshold.

30. The computer-readable memory of claim 22, wherein the program module for designating each extracted region having a histogram that does not exhibit a degree of similarity to one of the model histograms which exceeds the prescribed threshold as corresponding to the person or object of unknown identity, comprises sub-modules for:

for each extracted region, normalizing the similarity value associated with each pair of compared histograms by dividing it by a maximum possible similarity value to produce a match quality indicator;

identify the largest match quality indicator associated with each extracted region;

for each extracted region, designating the extracted region to be an unknown person or object whenever the largest match quality indicator does not exceeds the prescribed threshold.

31. A computer-implemented process for identifying a person or object in an image of a scene, said process comprising using a computer to perform the following process actions:

creating model histograms of people and objects that it is desired to identify in said image of the scene;

segmenting said image to extract regions which correspond to at least one person or object whose identity it is desired to determine;

for each region extracted from the image,
computing a histogram for the extracted region,
respectively assessing the degree of similarity between the extracted region histogram and at least some of said model histograms, and
designating each extracted region having a histogram that exhibits a degree of similarity to a one of the model histograms which exceeds a prescribed threshold as corresponding to the person or object associated with that model histogram; and storing the histogram computed for any extracted region of the image that is designated as corresponding to a person or object associated with a model histogram as an additional model histogram associated with that person or object.

* * * * *